US012057661B2

(12) United States Patent
Johannes et al.

(10) Patent No.: US 12,057,661 B2
(45) Date of Patent: Aug. 6, 2024

(54) ISOLATED PAIR QUADRAX INTERCONNECT

(71) Applicant: SMITHS INTERCONNECT AMERICAS, INC., Kansas City, KS (US)

(72) Inventors: Richard A. Johannes, Trabuco Canyon, CA (US); Trevor Lee Mitchell, Mission, KS (US); Konrad K. Wojciechowski, North Palm Beach, FL (US); Maximiliano Bozzo, Genoa (IT)

(73) Assignee: SMITHS INTERCONNECT AMERICAS, INC., Kansas City, KS (US)

( * ) Notice: Subject to any disclaimer, the term of this patent is extended or adjusted under 35 U.S.C. 154(b) by 0 days.

(21) Appl. No.: 17/772,969

(22) PCT Filed: Nov. 3, 2020

(86) PCT No.: PCT/US2020/058725
§ 371 (c)(1),
(2) Date: Apr. 28, 2022

(87) PCT Pub. No.: WO2021/091911
PCT Pub. Date: May 14, 2021

(65) Prior Publication Data

US 2024/0162662 A1 May 16, 2024

Related U.S. Application Data

(60) Provisional application No. 62/930,142, filed on Nov. 4, 2019.

(51) Int. Cl.
*H01R 13/6473* (2011.01)
*H01R 13/516* (2006.01)
(Continued)

(52) U.S. Cl.
CPC ....... *H01R 13/6473* (2013.01); *H01R 13/516* (2013.01); *H01R 24/84* (2013.01); *H01R 24/86* (2013.01); *H01R 2107/00* (2013.01)

(58) Field of Classification Search
CPC .. H01R 13/6473; H01R 13/516; H01R 24/84; H01R 24/86; H01R 2107/00
(Continued)

(56) References Cited

U.S. PATENT DOCUMENTS 7,175,478 B2 2/2007 Ollivier
7,316,584 B2 * 1/2008 Mackillop .......... H01R 13/6477 439/607.05
(Continued)

FOREIGN PATENT DOCUMENTS

CN 204333509 5/2015
DE 102017000632 7/2018
(Continued)

OTHER PUBLICATIONS

International Search Report and Written Opinion of the International Searching Authority (mailing date Feb. 25, 2021) for Corresponding International PCT Patent Application No. PCT/US2020/058725, filed Nov. 3, 2020.

*Primary Examiner* — Alexander Gilman
(74) *Attorney, Agent, or Firm* — Snell & Wilmer LLP

(57) ABSTRACT

A quadrax contact assembly includes an isolator having a longitudinal axis and defining four slots extending along the longitudinal axis and circumferentially spaced apart about the longitudinal axis, the four slots being accessible via radial openings in the isolator. The quadrax contact assembly further includes four contacts each configured to be received by a respective slot of the four slots by pressing each of the four contacts into the respective slot in a radial direction.

20 Claims, 5 Drawing Sheets

(51) Int. Cl.
*H01R 24/84* (2011.01)
*H01R 24/86* (2011.01)
*H01R 107/00* (2006.01)

(58) Field of Classification Search
USPC .......................................................... 439/626
See application file for complete search history.

(56) References Cited

U.S. PATENT DOCUMENTS

| | | | | |
|---|---|---|---|---|
| 7,736,159 | B1 * | 6/2010 | Effinger, III ........... | H01R 24/86<br>439/607.05 |
| 8,591,268 | B2 * | 11/2013 | Reimchen ............ | H01R 13/622<br>439/701 |
| 9,257,796 | B1 * | 2/2016 | Dang ................. | H01R 13/6463 |
| 9,306,333 | B2 * | 4/2016 | Dang ................. | H01R 13/6461 |
| 9,502,796 | B2 * | 11/2016 | Genau .................. | H01R 12/724 |
| 9,666,985 | B2 * | 5/2017 | Bernardi ............ | H01R 13/6477 |
| 9,728,902 | B2 * | 8/2017 | Höher ................ | H01R 13/6592 |
| 10,916,893 | B2 * | 2/2021 | Nguyen ............. | H01R 13/6593 |
| 11,114,796 | B2 * | 9/2021 | DeWitt ................ | H01R 13/514 |
| 2007/0259568 | A1 * | 11/2007 | Mackillop .......... | H01R 13/6477<br>439/638 |
| 2015/0270647 | A1 * | 9/2015 | Hoher ................ | H01R 13/6582<br>439/607.05 |

FOREIGN PATENT DOCUMENTS

| | | |
|---|---|---|
| EP | 1825575 | 4/2008 |
| EP | 3036799 | 10/2019 |
| WO | WO2019/183143 | 9/2019 |

* cited by examiner

ISOLATED PAIR QUADRAX INTERCONNECT

CROSS-REFERENCE TO RELATED APPLICATIONS

This application claims the benefit and priority of U.S. Provisional Application No. 62/930,142, titled Isolated Pair Quadrax Interconnect and filed on Nov. 4, 2019, the entire contents of which is hereby incorporated by reference in its entirety.

BACKGROUND

1. Field

This specification relates to a quadrax contact assembly designed to connect a quadrax cable to another quadrax cable, or to connect a quadrax cable to another quadrax contact or connector.

2. Description of the Related Art

Coaxial cable is a type of electrical cable having an inner conductor surrounded by a concentric conducting shield separated from the conductor by a dielectric material. Coaxial cable may carry high-frequency electrical signals with relatively low losses. Twinaxial cable is similar to coaxial cable but utilizes two inner conductors rather than the one conductor of coaxial cable. A quadrax cable is similar to twinaxial cable but includes four inner conductors rather than the two of twinaxial.

Because the inner conductors transfer differential pair signals, it is important for quadrax cables and connectors to be designed to certain specifications. In order to meet the strict specifications required of quadrax, such connectors and contacts are conventionally designed with multiple components that are each coupled together to form a contact or contact assembly. However, such complex components results in conventional quadrax contact assemblies being relatively expensive and complicated to manufacture and assemble.

Thus, there is a need in the art for quadrax connectors that provide quality data transmissions and are relatively inexpensive and easy to manufacture and assemble.

SUMMARY

Described herein is a quadrax contact assembly. The quadrax contact assembly includes an isolator having a longitudinal axis and defining four slots extending along the longitudinal axis and circumferentially spaced apart about the longitudinal axis, the four slots being accessible via radial openings in the isolator. The quadrax contact assembly further includes four contacts each configured to be received by a respective slot of the four slots by pressing each of the four contacts into the respective slot in a radial direction.

Also described is a quadrax contact assembly. The quadrax contact assembly includes an isolator having a longitudinal axis and defining four slots extending along the longitudinal axis and circumferentially spaced apart about the longitudinal axis. The quadrax contact assembly further includes four contacts each configured to be received by a respective slot of the four slots by pressing each of the four contacts into the respective slot in a radial direction. The quadrax contact assembly further includes a conductive outer body configured to be positioned radially outward from the isolator and the four contacts and to at least partially enclose the isolator and the four contacts. The quadrax contact assembly further includes a partially conductive barrier configured to be located between a first two contacts of the four contacts and a second two contacts of the four contacts.

Also described is a quadrax contact assembly. The quadrax contact assembly includes an isolator having a longitudinal axis and defining four slots extending along the longitudinal axis and circumferentially spaced apart about the longitudinal axis, the four slots being accessible via radial openings in the isolator. The quadrax contact assembly further includes four contacts each configured to be received by a respective slot of the four slots by pressing each of the four contacts into the respective slot in a radial direction. The quadrax contact assembly further includes a partially conductive barrier configured to be located between a first two contacts of the four contacts and a second two contacts of the four contacts.

BRIEF DESCRIPTION OF THE DRAWINGS

Other systems, methods, features, and advantages of the present invention will be apparent to one skilled in the art upon examination of the following figures and detailed description. Component parts shown in the drawings are not necessarily to scale, and may be exaggerated to better illustrate the important features of the present invention.

DETAILED DESCRIPTION

Figure 1A:
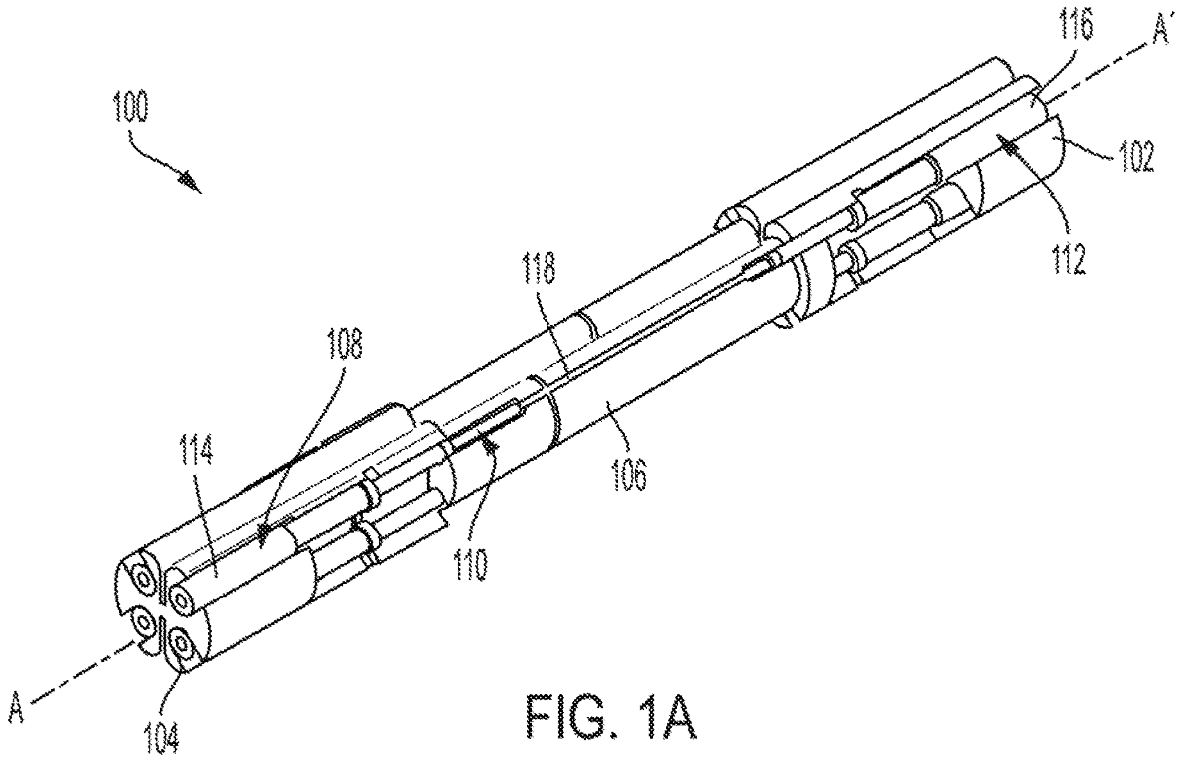
FIG. 1A illustrates a perspective view of a quadrax contact assembly without an outer body, according to various embodiments of the invention.
Figure 1B:
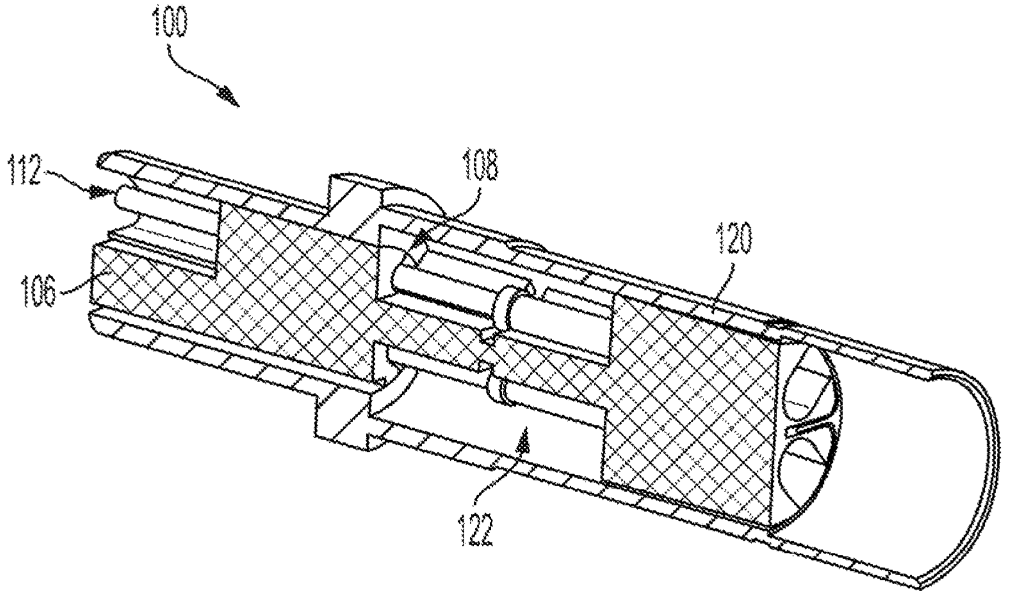
FIG. 1B illustrates a perspective cross-sectional view of the quadrax contact assembly of FIG. 1A, according to various embodiments of the invention.
Figure 1C:
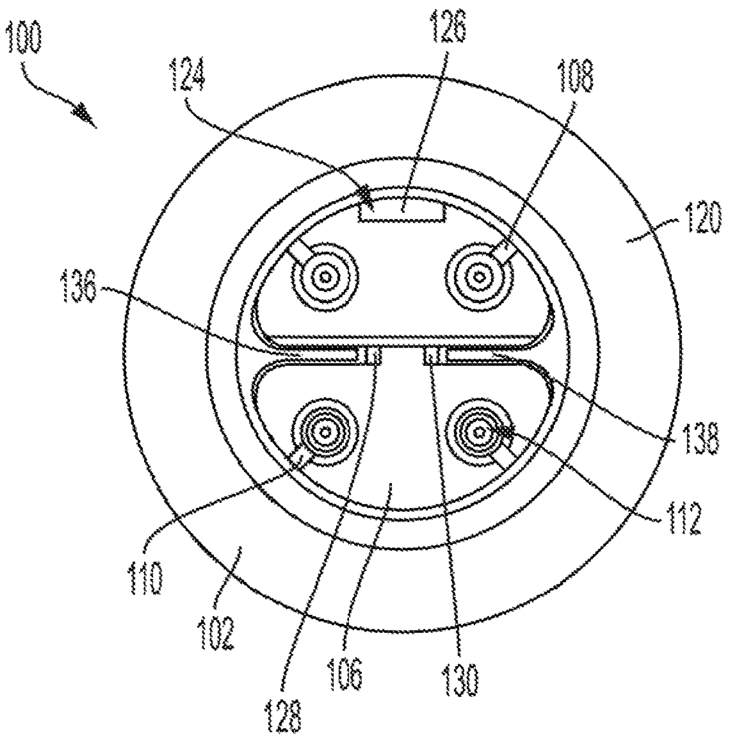
FIG. 1C illustrates a cross-sectional view of a contact side of the quadrax contact assembly of FIG. 1A, according to various embodiments of the invention.
Figure 1D:
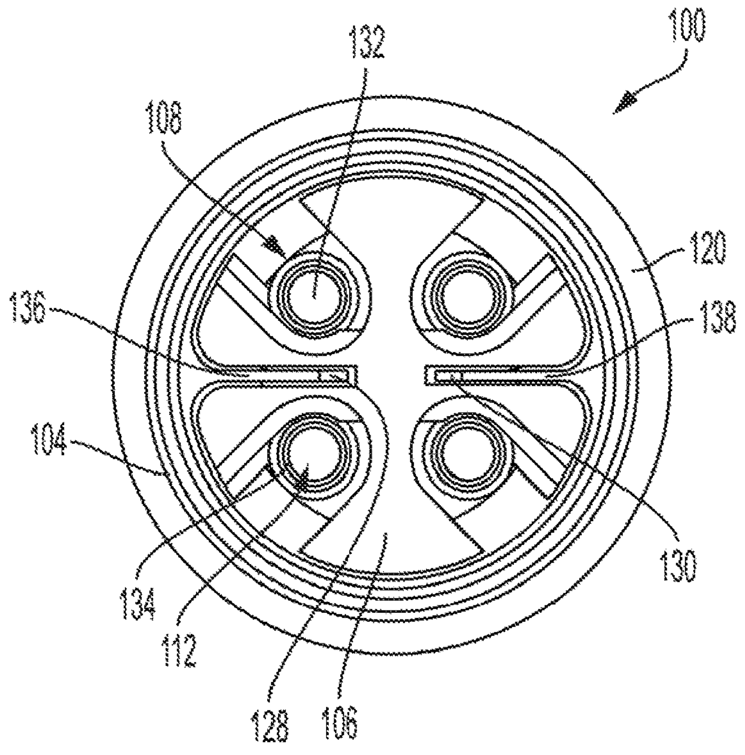
FIG. 1D illustrates a cross-sectional view of a cable side of the quadrax contact assembly of FIG. 1A, according to various embodiments of the invention.
Figure 1E:
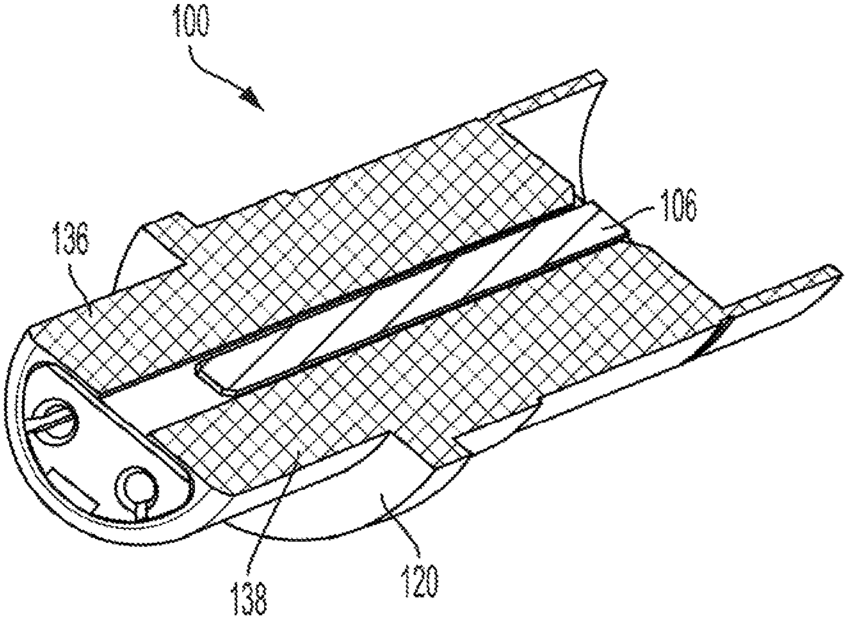
FIG. 1E illustrates a perspective cross-sectional view of a return plane of the quadrax contact assembly of FIG. 1A, according to various embodiments of the invention.

The quadrax contact assembly, or quadrax contact system, disclosed herein is designed to terminate a quadrax cable to provide bandwidth of greater than 10 Gigabits per second (Gbps), while achieving bit error rates of 10-12 or less. The quadrax contact assembly further significantly reduces the problems of near end and far end crosstalk, ensuring unparalleled quadrax electrical performance. The quadrax contact assembly thus provides twinax level capabilities without the robustness issues present in twinax systems (e.g., pistoning). The quadrax contact assembly achieves characteristic impedance values that average over 100 ohms nominally, providing head room for the capacitive drop in impedance for printed circuit board (PCB) versions of an interconnect with which the quadrax contact assembly is used. These characteristics are achieved using a variety of features as disclosed below, such as a solid terminated ground (rather than a floating ground conventionally used) and a single isolator that provides insulating characteristics to the various contacts within the quadrax contact assembly.

The quadrax contact assembly may be used in a number of connector assemblies for use in military, medical, or other systems with high fidelity requirements. For example, the quadrax contact assembly may be used in a D-sub, ARINC, D38999, or other high fidelity connector assemblies.

Referring to FIGS. 1A-1E, the quadrax contact assembly 100 has a longitudinal axis A-A'. A first side 102 of the quadrax contact assembly 100 operates as a contact side 102 and is designed to be coupled to another quadrax contact. The other side 104 of the quadrax contact assembly 100 operates as a cable side 104. In some embodiments, the cable side 104 is designed to be coupled to a quadrax cable (i.e., a cable with two differential pairs of wires or leads). In that regard, the quadrax contact assembly 100 may be used in conjunction with another quadrax contact to connect two quadrax cables together (e.g., the cable side 104 of each quadrax contact assembly is connected to a quadrax cable and the contact side 102 of each quadrax contact assembly connect together to electrically connect the two quadrax cables). In some embodiments, the contact side 102 and the cable side 104 may have identical characteristics and, in some embodiments, the contact side 102 and the cable side 104 may have different characteristics (as shown in detail in FIGS. 1C and 1D).

The quadrax contact assembly 100 includes an isolator 106 that runs along the longitudinal axis A-A' of the quadrax contact. The isolator 106 defines or includes four slots 108 that extend along the length of the isolator 106. The four slots 108 may be spaced apart circumferentially about the isolator 106. In some embodiments, the four slots 108 may be evenly spaced apart circumferentially or may be spaced different distances apart circumferentially. Each of the four slots 108 may have a radial opening 110 defined by the isolator 106. The radial opening 110 of the four slots 108 may extend along the entire length of the isolator 106.

The quadrax contact assembly 100 may further include four contacts 112. Each of the four contacts 112 is designed to be received by one of the four slots 108. In some embodiments, each of the four contacts 112 may be press-fit into the respective slot or may otherwise be placed in the respective slot. For example, one or more of the contacts 112 may be axially inserted into the respective slots. Two of the four contacts 112 may operate as a first differential pair, and the remaining two contacts 112 may operate as a second differential pair.

Each of the four contacts 112 may have a male contact on one end and a wire or conductor termination at the other end. The male contact may be engaged with a female contact at one end and a wire or conductor termination at the other end to provide a mated interface. In some embodiments, one or both ends of the contacts 112 may connect to another electrical component (e.g., a wire or other connector (such as a PCB mount solder or solderless interface)) via any other means such as crimping, soldering, or the like. For example, each of the four contacts 112 (e.g., at the ends of the contacts) may have a cable crimp or solder area to facilitate connection to the isolator 106 or to the other electrical component.

The isolator 106 may operate as an insulator. In that regard, the isolator 106 may be formed from a non-conductive material such as plastic, rubber, or any other electrical insulator. The isolator 106 may thus isolate each of the four contacts 112 from each other.

The isolator 106 may be formed monolithically or integrally. Stated differently, the isolator 106 may be a single component and may be formed from a single piece of material. This is beneficial as it reduces a part count of the quadrax contact assembly 100, thus reducing a total cost of the quadrax contact assembly 100 and increasing ease of assembly. Additionally, forming a single, monolithic component is less expensive and may be easier to manufacture than forming multiple components, especially if the multiple components have different forms or shapes.

Each of the four contacts 112 may have a greater diameter at the axial ends 114, 116 (e.g., the contact side 102 and the cable side 104) of the quadrax contact assembly 100 than at locations closer to a center 118 of the contacts 112. The four slots 108 may have similar dimensions to allow for a press-fit or other interference fit between the contacts 112 and the slots 108 along the entire length of the slots 108 and contacts 112. In that regard, the shape of the four slots 108 may match or be similar in shape to the four contacts 112 along the entire lengths thereof.

The quadrax contact assembly 100 may further include an outer body 120. The outer body 120 may be designed to be located radially outward from the isolator 106 and the four contacts 112. In that regard, the outer body 120 may enclose the four contacts 112 and the isolator 106. In some embodiments, the outer body 120 may be slid or otherwise manipulated over the isolator 106 and the contacts 112 by moving the outer body 120 along the axial direction from either the contact side 102 or the cable side 104.

The outer body 120 may be conductive. In that regard, the outer body may be formed from a metal or any other conductive material such as copper, tin, aluminum, or the like. The outer body 120 may be designed to be coupled to a solid terminated ground rather than function as a floating ground, thus improving performance of the quadrax contact assembly 100. For example, the outer body 120 may mate with an outer body of another quadrax contact assembly, and such mating of the outer bodies 120 may provide ground continuity through the contacts from cable shield to cable shield, or from PCB to cable shield. In some embodiments, the outer body 120 may be formed integrally or monolithically, meaning that it may include or be formed from a single piece of material. In some embodiments, the outer body 120 may include multiple outer body portions that are permanently or removably coupled together to form a single outer body subassembly 120.

In some embodiments, the four contacts 112 may be enclosed between the outer body 120 and the isolator 106. In that regard, the contacts 112 may be retained in place due to one or more of the press fit of the contacts 112 into the slots 108 of the isolator 106, by their enclosure between the isolator 106 and the outer body 120, or the like.

The outer body 120 may be coupled to the isolator 106 and/or the four contacts 112 in any of a variety of manners. For example, an adhesive may be used to couple the components together. As another example, a fastener (such as a screw, nut, clamp, snap ring, or the like) may be fastened to the outer body 120 and the isolator 106 to couple the two together. As yet another example, the outer body 120 may be crimped around the isolator 106 (e.g., at the cable side 104 or any other location) to fasten the components of the quadrax contact assembly 100 together.

The outer body 120 may define inductive pockets 122 that form an open area around a portion of each of the contacts 112. The size and shape of the inductive pockets 122 may be selected to achieve a desired impedance of the quadrax contact assembly 100. The inductive pockets 122 may be located at any location along the length of the isolator 106. In some embodiments, the inductive pockets 122 may be located proximal to one or both of the contact side 102 or the cable side 104.

In some embodiments, one of the outer body 120 or the isolator 106 may define or include a key 124 designed to interface with a keyhole 126 of the other of the outer body 120 or the isolator 106. The key 124 and the keyhole 126 may facilitate alignment of the outer body 120 and the isolator 106 when coupling the outer body 120 to the isolator 106.

In some embodiments, the isolator 106 may define two slots 128, 130. The two slots 128, 130 may extend inward towards a radial center of the isolator 106. Each of the two slots 128, 130 may extend between a pair of contacts 112. For example, the slot 128 may extend between a first contact 132 and a second contact 134. The outer body 120 may define two inward extending portions or wings 136, 138. The first inward extending wing 136 may be received by the first slot 128, and the second inward extending wing 138 may be received by the second slot 130. In that regard, each of the inward extending wings 136, 138 may be located between a pair of contacts 112 (e.g., the first inward extending wing 136 may be located between the first contact 132 and the second contact 134). In that regard, the inward extending wings 136, 138 may operate as a partial conductive barrier integrated into the body of the quadrax contact assembly 100 (e.g., due to the conductive nature of the outer body 120 and, thus, the inward extending wings 136, 138).

Figure 2A:
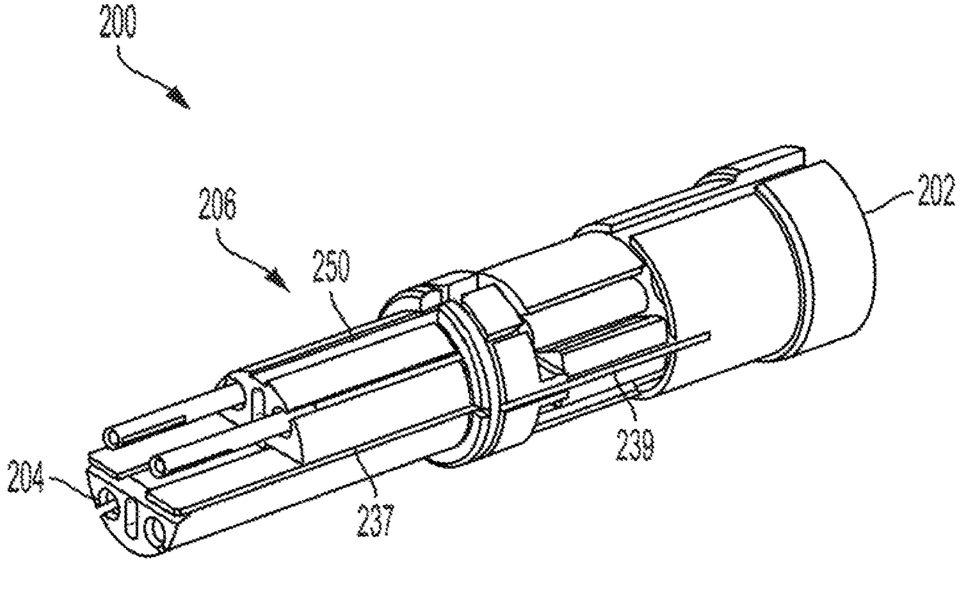
FIG. 2A illustrates a perspective view of a quadrax contact assembly, according to various embodiments of the invention.
Figure 2B:
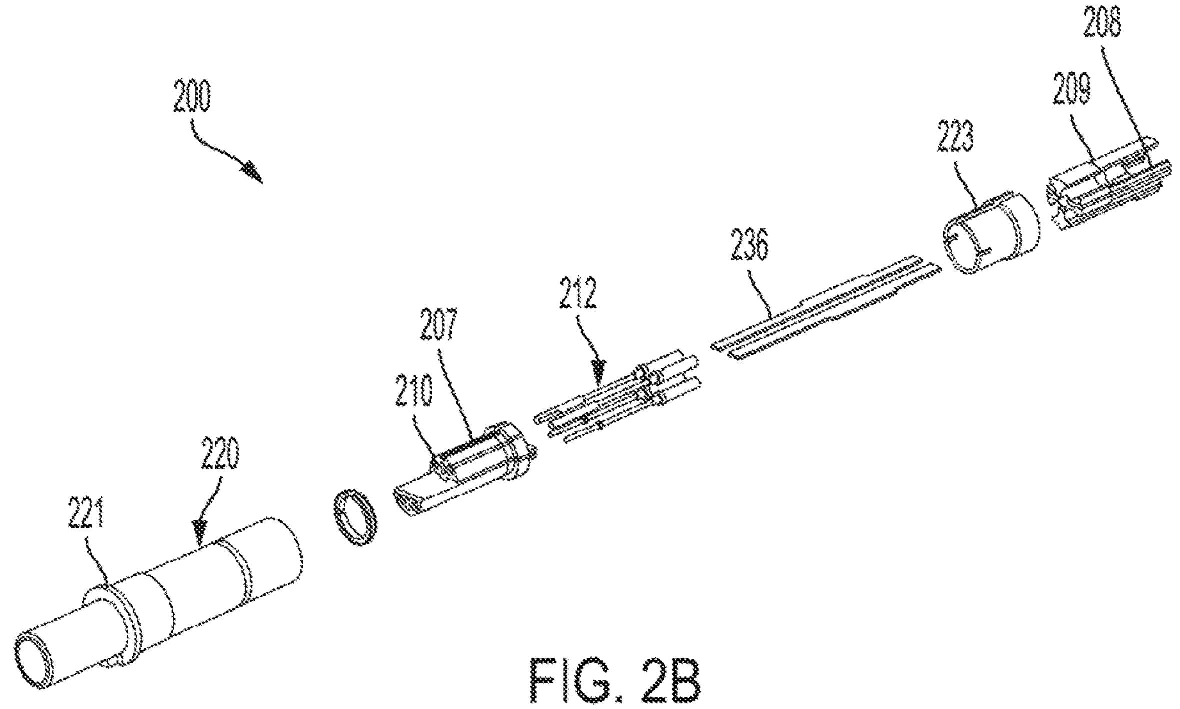
FIG. 2B illustrates an exploded view of the quadrax contact assembly of FIG. 2A, according to various embodiments of the invention.
Figure 2C:
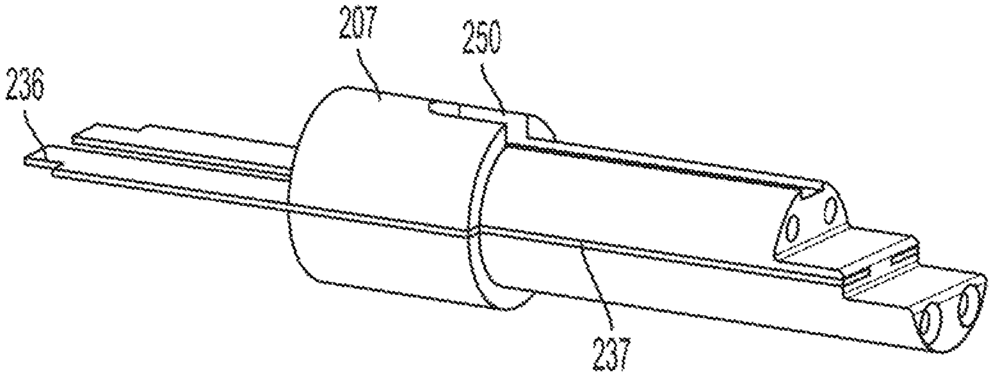
FIG. 2C illustrates a perspective view of a portion of the quadrax contact assembly of FIG. 2A, according to various embodiments of the invention.

Referring now to FIGS. 2A, 2B, and 2C, another quadrax contact assembly 200 may include similar features as the quadrax contact assembly 100 of FIG. 1A. The quadrax contact assembly 200 includes a first side 202 which operates as a contact side 202 and is designed to be coupled to another quadrax contact and a second side 204 which operates as a cable side 204.

The quadrax contact assembly 200 includes an isolator 206 that extends along a portion of a longitudinal axis of the quadrax contact assembly 200. The isolator 206 may include two or more separate isolator portions 207, 209. In that regard, the two or more isolator portions 207, 209 may together form the isolator 206. The two or more separate portions 207, 209 may contact one another when the quadrax contact assembly 200 is assembled or may be spaced apart when the quadrax contact assembly 200 is assembled. One of the portions 209 defines or includes four slots 208 that extend along the length of the portion 209. The four slots 208 may be spaced apart circumferentially about the portion 209. In some embodiments, the four slots 108 may be evenly spaced apart circumferentially or may be spaced different distances apart circumferentially. Each of the four slots 208 may have a radial opening defined by the portion 209. The radial opening of the four slots 208 may extend along the entire length of the portion 209. The other portion 207 may define slots 210 that are circumferentially enclosed. In some embodiments, the slots 210 may be partially open in the radial direction. The slots 210 of the other portion 207 may receive contacts by axially inserting the contacts therethrough.

The quadrax contact assembly 200 may further include four contacts 212. Each of the four contacts 212 is designed to be received by one of the four slots 208 of the portion 209. In some embodiments, each of the four contacts 212 may be press-fit into the respective slot or may otherwise be placed in the respective slot. For example, one or more of the contacts 212 may be axially inserted into the respective slots. Each of the four contacts 212 may be received by one of the four slots 210 of the portion 207. Two of the four contacts 212 may operate as a first differential pair, and the remaining two contacts 212 may operate as a second differential pair.

The quadrax contact assembly 200 may further include a conductive outer body assembly 220. The outer body assembly 220 may be designed to be located radially outward from the isolator 206 and the four contacts 212. In that regard, the outer body assembly 220 may at least partially enclose the four contacts 212 and the isolator 206. In some embodiments, the outer body assembly 220 may be slid or otherwise manipulated over the isolator 206 and the contacts 212 by moving the outer body 220 along the axial direction from either the contact side 202 or the cable side 204.

The outer body assembly 220 may include a first portion 221 and a second portion 223. The first portion 221 is designed to at least partially surround and enclose the portion 207 of the isolator 206, and the second portion 223 is designed to at least partially surround and enclose the portion 209 of the isolator 206. The first portion 221 and the second portion 223 may be in contact when the quadrax contact assembly 200 is assembled to provide ground continuity therealong. In some embodiments, the first portion 221 may be spaced apart from the second portion 223 with ground continuity being provided by another means. The outer body assembly 220 may be coupled to the quadrax contact assembly 200 in any of a variety of manners such as snap rings, fasteners, interference fit, or the like.

The quadrax contact assembly 200 may further include a partially conductive barrier 236. The partially conductive barrier 236 may include one, two, or more separate pieces that form a barrier between two of the four contacts 212. As shown in FIG. 2B, the partially conductive barrier 236 may include two separate barriers such that one of the barriers separates two contacts 212 from each other and the other of the barriers separate the other two contacts 212 from each other.

The portion 207 of the isolator 206 may form two slots 237 each designed to receive one of the two barriers 236, and the portion 209 of the isolator 206 may form an additional two slots 239 each designed to receive one of the two barriers 236. In that regard, the barrier 236 may be retained in place by the slots 237, 239 and separation of the barrier 236 from the slots 237, 239 may be restricted by placement of the outer body assembly 220 around the isolator 206 and barrier 236. The barriers 236 may provide ground continuity between the portions 221, 223 of the outer body assembly 220.

In some embodiments, the portion 207 of the isolator 206 may be designed to include a scoop-proof feature 250. For example, the scoop-proof feature 250 may include a slot or opening into which a bayonet of a corresponding connector is received, or the scoop-proof feature 250 may include a bayonet that is to be received by a slot or opening of a corresponding connector.

Figure 3:
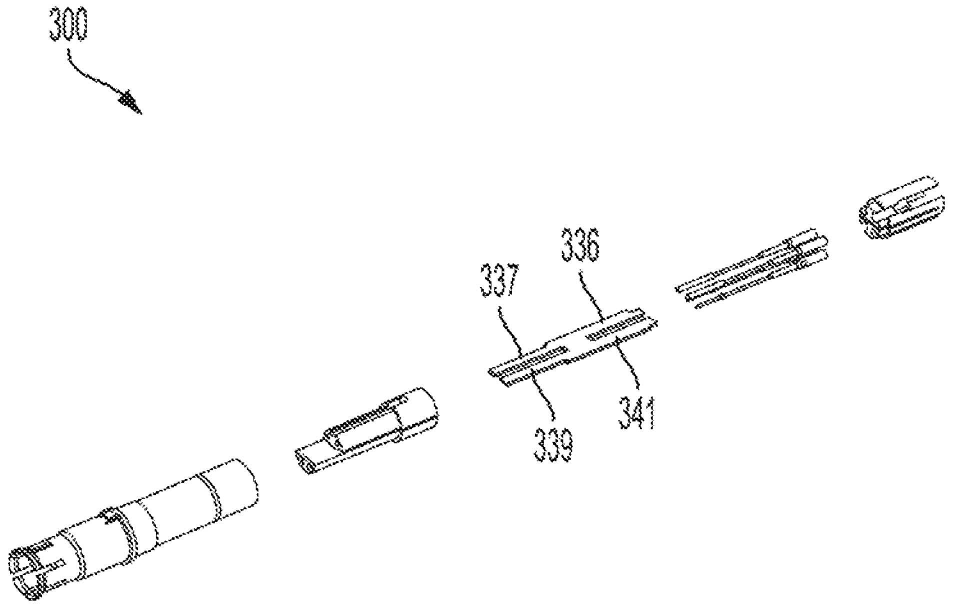
FIG. 3 illustrates an exploded view of a quadrax contact assembly, according to various embodiments of the invention.

Referring briefly to FIG. 3, another quadrax contact assembly 300 may include similar or identical features as the quadrax contact assembly 200 of FIGS. 2A, 2B, and 2C. However, the quadrax contact assembly 300 may include a partially conductive barrier 336 that includes two barriers 337, 339 joined together by a central portion 341. In that regard, the barriers 337, 339 and the central portion 341 may form a generally H-shaped barrier 336. The H-shaped barrier 336 may be retained in place relative to the quadrax contact assembly 300 in a similar manner as the barrier 226 of FIG. 2A. The barrier 337 may be located between two adjacent contacts and the barrier 339 may be located between the remaining two adjacent contacts.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A quadrax contact assembly comprising:

an isolator having a longitudinal axis and defining four slots extending along the longitudinal axis and circumferentially spaced apart about the longitudinal axis, the four slots being accessible via radial openings in the isolator;

four contacts each configured to be received by a respective slot of the four slots by pressing each of the four contacts into the respective slot in a radial direction; and an outer body configured to be positioned radially outward from the isolator and the four contacts and to at least partially enclose the isolator and the four contacts, the outer body being conductive and including two inward-extending portions each configured to extend towards the longitudinal axis of the isolator to form a partially conductive barrier between two of the four contacts.

2. The quadrax contact assembly of claim 1 wherein each of the four contacts has a greater diameter at axial ends of the four contacts than at locations nearer to an axial center of the four contacts, and wherein the radial openings have a greater distance at axial ends of the four slots in order to match the greater diameter of the four slots at the axial ends.

3. The quadrax contact assembly of claim 1 wherein the isolator functions as an insulator between each of the four contacts.

4. The quadrax contact assembly of claim 1 wherein the isolator is formed monolithically.

5. The quadrax contact assembly of claim 1 wherein the outer body defines inductive pockets configured to at least partially surround each of the four contacts at a location proximal to axial ends of the outer body in order to achieve a desired impedance of the quadrax contact assembly.

6. The quadrax contact assembly of claim 1 wherein the outer body includes a single piece and is designed to slide in place along the longitudinal axis of the isolator.

7. The quadrax contact assembly of claim 1 wherein at least one of the isolator or the outer body includes a key to facilitate alignment of the isolator relative to the outer body.

8. The quadrax contact assembly of claim 1 wherein the outer body is configured to be coupled to a solid terminated ground.

9. The quadrax contact assembly of claim 1 wherein at least one of a first pair of contacts includes a first pair of socket contacts and a second pair of contacts includes a first pair of pin contacts, or the first pair of contacts includes the first pair of socket contacts and the second pair of contacts includes a second pair of socket contacts.

10. The quadrax contact assembly of claim 1 wherein the four contacts are cavity compatible with a plurality of relevant connector housing configurations and designs.

11. The quadrax contact assembly of claim 1 further comprising a cable side and a contact side, wherein the four contacts are configured to be coupled to a quadrax cable at the cable side and to be coupled to another contact at the contact side.

12. The quadrax contact assembly of claim 1 wherein the outer body has a socket configuration, wherein the quadrax contact assembly is configured to mate with a second quadrax contact assembly having an outer body with a pin configuration for providing ground continuity in a mated state.

13. The quadrax contact assembly of claim 1 wherein the isolator includes a first portion and a second portion separate from the first portion, wherein the first portion defines each of the four slots.

14. A quadrax contact assembly comprising:

an isolator having a longitudinal axis and defining four slots extending along the longitudinal axis and circumferentially spaced apart about the longitudinal axis;

four contacts each configured to be received by a respective slot of the four slots by pressing each of the four contacts into the respective slot in a radial direction;

a conductive outer body configured to be positioned radially outward from the isolator and the four contacts and to at least partially enclose the isolator and the four contacts;

a first partially conductive barrier configured to be located between a first two contacts of the four contacts; and a second partially conductive barrier configured to be located between a second two contacts of the four contacts.

15. The quadrax contact assembly of claim 14, wherein the conductive outer body includes a first axial body portion and a second axial body portion configured to engage with the first axial body portion, the first axial body portion being configured to receive the first partially conductive barrier and the second partially conductive barrier from a first axial direction and the second axial body portion being configured to receive the first partially conductive barrier and the second partially conductive barrier from a second axial direction such that the first partially conductive barrier and the second partially conductive barrier are retained in place by at least one of the first axial body portion or the second axial body portion.

16. A quadrax contact assembly comprising:

an isolator having a longitudinal axis and defining four slots extending along the longitudinal axis and circumferentially spaced apart about the longitudinal axis, the four slots being accessible via radial openings in the isolator;

four contacts each configured to be received by a respective slot of the four slots by pressing each of the four contacts into the respective slot in a radial direction;

a first partially conductive barrier configured to be located between a first two contacts of the four contacts; and a second partially conductive barrier configured to be located between a second two contacts of the four contacts.

17. The quadrax contact assembly of claim 14 further comprising a cable side and a contact side, wherein the four contacts are configured to be coupled to a quadrax cable at the cable side and to be coupled to another contact at the contact side.

18. The quadrax contact assembly of claim 16 wherein the first partially conductive barrier and the second partially conductive barrier are coupled together by a central portion forming an H-shaped partially conductive barrier.

19. The quadrax contact assembly of claim 16 further comprising a conductive outer body configured to be positioned radially outward from the isolator, the four contacts, the first partially conductive barrier, and the second partially conductive barrier and to at least partially enclose the isolator, the four contacts, the first partially conductive barrier, and the second partially conductive barrier.

20. The quadrax contact assembly of claim 16 further comprising a cable side and a contact side, wherein the four contacts are configured to be coupled to a quadrax cable at the cable side and to be coupled to another contact at the contact side.

* * * * *